(12) United States Patent
Dong

(10) Patent No.: US 12,557,060 B2
(45) Date of Patent: Feb. 17, 2026

(54) TRACKING-AREA UPDATE METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 386 days.

(21) Appl. No.: 18/032,955

(22) PCT Filed: Oct. 22, 2020

(86) PCT No.: PCT/CN2020/122940
§ 371 (c)(1),
(2) Date: Apr. 20, 2023

(87) PCT Pub. No.: WO2022/082643
PCT Pub. Date: Apr. 28, 2022

(65) Prior Publication Data
US 2023/0388955 A1    Nov. 30, 2023

(51) Int. Cl.
*H04W 60/04* (2009.01)
*H04W 64/00* (2009.01)

(52) U.S. Cl.
CPC ........... *H04W 60/04* (2013.01); *H04W 64/00* (2013.01)

(58) Field of Classification Search
CPC ..... H04W 60/04; H04W 64/00; H04W 4/029; H04W 8/16; H04W 60/00; H04W 48/18; H04W 8/02; H04W 4/02; H04W 4/025; H04W 4/40; H04W 48/04; H04W 36/32; H04W 12/37; H04W 36/0066; H04W 8/08; H04W 76/28; H04W 88/08; H04W 12/08; H04W 36/0016; H04W 36/0022; H04W 36/0058; H04W 36/0064;
(Continued)

(56) References Cited

U.S. PATENT DOCUMENTS

2011/0078238 A1* 3/2011 Sakka ............... H04L 67/52
709/203
2013/0040644 A1* 2/2013 Lin ............... H04W 64/006
455/436
(Continued)

FOREIGN PATENT DOCUMENTS

CN 104427476 A 3/2015
CN 105592540 A 5/2016
(Continued)

OTHER PUBLICATIONS

Nokia Siemens Networks,"Tracking Area Update Procedure",3GPP TSG-CT WG1 Meeting #63,C1-100307, San Francisco (USA), Feb. 22-26, 2010.
(Continued)

*Primary Examiner* — Nimesh Patel
(74) *Attorney, Agent, or Firm* — Volpe Koenig

(57) ABSTRACT

A tracking-area update method, performed by UE, and including: reporting auxiliary information, the auxiliary information includes location information and movement information of the UE; the auxiliary information is configured to determine whether the UE is located in a boundary of two Tracking Areas by a core network.

12 Claims, 11 Drawing Sheets

(58) Field of Classification Search
CPC ....... H04W 36/00837; H04W 36/0085; H04W 36/12; H04W 36/14; H04W 4/021; H04W 48/02; H04W 84/042; H04W 8/26; H04W 92/02; H04W 92/10; H04W 92/18; H04W 72/23; H04W 76/14; H04W 72/56; H04W 72/0446; H04W 76/15; H04W 48/20; H04W 76/10; H04W 36/22; H04W 88/085; H04W 72/569; H04W 74/006; H04W 76/16; H04W 88/10; H04W 8/245; H04W 12/63; H04W 72/25; H04W 12/61; H04W 4/50; H04W 48/10; H04W 72/04; Y02D 30/70; G08G 1/096805; G08G 1/01; G08G 1/142; G08G 1/148; G08G 1/168; G08G 1/0125; G08G 1/096725; H04L 63/1425; H04L 63/20; H04L 12/14; H04L 12/1407; H04L 5/0023; H04L 67/14; H04L 5/0053; H04L 5/0055; H04L 2001/0093; H04L 2209/80; H04L 63/101; H04L 43/16; G01S 19/06; G01S 19/25; G01S 2205/008; G01S 5/0221; G01S 13/58; G01S 13/865; G01S 17/58; G01S 17/66; G01S 19/24; G01S 5/00; G01S 5/0009; G01S 5/0018; G01S 5/01; A61B 2034/2055; A61B 2034/2065; A61B 34/20; B60W 2520/06; B60W 2420/408; B60W 2420/403; B60W 2420/00; B60W 2520/10; B60W 2520/105; B60W 2540/18; B60W 2520/14; B60W 2552/10; B60W 2556/50; B60W 2554/20; B60W 2556/45; B60W 2554/40; B60W 2754/20; B60W 30/10; B60W 30/12; B60W 30/18163; B60W 30/14; B60W 40/10; B60W 40/02; B60W 60/001; H04B 7/0695; H04B 7/06954; H04B 17/373; H04B 7/0456; H04B 7/0626; H04B 7/088; H04B 7/18547
See application file for complete search history.

(56) References Cited

U.S. PATENT DOCUMENTS

| | | | |
|---|---|---|---|
| 2014/0221002 A1* | 8/2014 | Kahn | H04W 12/08 |
| | | | 455/456.1 |
| 2017/0311130 A1* | 10/2017 | Davidsson | G06F 16/9537 |
| 2018/0041984 A1* | 2/2018 | Li | H04W 8/08 |
| 2018/0367953 A1 | 12/2018 | Shimizu et al. | |
| 2021/0377845 A1* | 12/2021 | Liu | H04W 8/06 |

FOREIGN PATENT DOCUMENTS

| | | |
|---|---|---|
| CN | 109565787 A | 4/2019 |
| CN | 111586582 A | 8/2020 |
| CN | 111757267 A | 10/2020 |
| EP | 2375835 A1 | 10/2011 |
| KR | 101624668 B1 | 5/2016 |
| WO | 2017018838 A1 | 2/2017 |
| WO | 2017169281 A1 | 10/2017 |
| WO | 2020/034333 A1 | 2/2020 |
| WO | 2020043349 A1 | 3/2020 |

OTHER PUBLICATIONS

Media Tek Inc."3GPP TSG-RAN WG2 Meeting #111-e R2-2006642" On Idle Mode Procedures in NR-NTN, Aug. 6, 2020 (Aug. 6, 2020),section 2.1.

Panasonic. "3GPP TSG-RAN WG2 Meeting#111-e R2-2006821" Issues of the Fixed Tracking Area in NTN, Aug. 6, 2020 (Aug. 6, 2020),section 2.

* cited by examiner

TRACKING-AREA UPDATE METHOD AND APPARATUS, COMMUNICATION DEVICE, AND STORAGE MEDIUM

CROSS REFERENCE TO RELATED APPLICATION

The present application is a U.S. National Stage of International Application No. PCT/CN2020/122940, filed on Oct. 22, 2020, the contents of all of which are incorporated herein by reference in their entireties for all purposes.

SUMMARY

The present disclosure provides a tracking area update method and apparatus, a communication device, and a storage medium.

According to a first aspect of examples of the present disclosure, a tracking area update method performed by User Equipment (UE) is provided and includes reporting auxiliary information that includes location information and movement information of the UE. The auxiliary information is configured to determine whether the UE is located within a boundary of two Tracking Areas by a core network.

According to a second aspect of the examples of the present disclosure, a tracking area update method performed by a core network is provided and includes receiving auxiliary information that includes location information and movement information of the UE. The auxiliary information is configured to determine whether the UE is located within a boundary of two Tracking Areas by a core network.

According to a third aspect of the examples of the present disclosure, a communication device is provided, and includes a processor and a memory for storing executable instructions capable of running on the processor, where, in response to determining that the processor is configured to run the executable instructions, the executable instructions execute the steps in any of the tracking area update methods described above.

According to a fourth aspect of the examples of the present disclosure, a non-temporary computer-readable storage medium storing computer-executable instructions is provided; and, in response to determining that the computer-executable instructions are executed by a processor, the steps of the tracking area update method are implemented.

BRIEF DESCRIPTION OF THE DRAWINGS

The accompanying drawings are incorporated into the specification and constitute a part of the specification, show examples consistent with the present invention, and are used to explain the principle of the examples of the present invention together with the specification.

DETAILED DESCRIPTION

Embodiments will be described in detail here, and their examples are shown in the accompanying drawings. When the following descriptions refer to the figures, the same numbers in different figures indicate the same or similar elements, unless otherwise indicated. Implementations described in the following examples do not represent all implementations consistent with the examples of the present disclosure. Instead, they are merely examples of apparatuses and methods consistent with some aspects of the examples of the present disclosure described, as detailed in the appended claims.

The terms used in the examples of the present disclosure are merely for the purpose of describing specific examples, and are not intended to limit the examples of the present disclosure. The terms "a/an" and "the" in the singular form used in the examples of the present disclosure and the appended claims are also intended to include the plural form, unless otherwise clearly indicated in the context. It should be further understood that the term "and/or" used in the present disclosure refers to and includes any or all possible combinations of one or more of the associated listed items.

It should be understood that although the terms "first", "second", "third", etc., may be used in the examples of the present disclosure to describe various types of information, the information should not be limited to these terms. These terms are merely used to distinguish the same type of information from one another. For example, without departing from the scope of the examples of the present disclosure, the first information may also be referred to as second information, and similarly, the second information may also be referred to as first information. Depending on the context, the word "if" as used herein may be interpreted as "when" or "upon" or "in response to determining".

To better describe any examples of the present disclosure, an example of the present disclosure uses an application scenario of access control to perform an example description.

Figure 1:
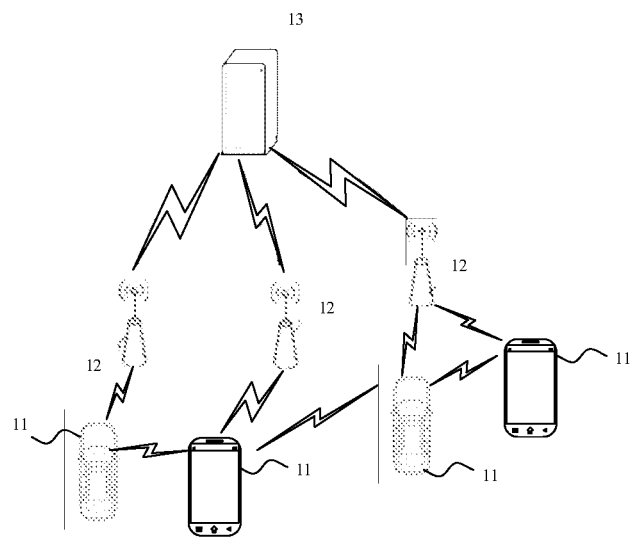
FIG. 1 is a schematic structural diagram of a radio communication system, according to an example.

FIG. 1 shows a schematic structural diagram of a radio communication system according to an example of the present disclosure. As shown in FIG. 1, the radio communication system is a communication system based on a cellular mobile communication technology and may include a plurality of terminals 11 and a plurality of base stations 12.

The terminal 11 may refer to a device for providing voice and/or data connectivity for a user. The terminal 11 may be in communication with one or more core networks via an RAN (Radio Access Network), and the terminal 11 may be an Internet of Things terminal, such as a sensor device, a mobile phone (or "cellular" phone), and a computer having the Internet of Things terminal, for example, may be a fixed, portable, pocket, handheld, computer built-in, or vehicle-mounted apparatus, such as a station (STA), a subscriber unit, a subscriber station, a mobile station, a mobile, a remote station, an access point, a remote terminal, an access terminal, a user equipment, a user agent, a user device, or a user terminal. Or the terminal 11 may also be an unmanned aerial vehicle device. Or the terminal 11 may also be a vehicle-mounted device, for example, a trip computer having a radio communication function, or a radio terminal connected to the trip computer externally. Or the terminal 11 may also be a roadside device, for example, a street lamp having the radio communication function, a signal light, or other roadside devices.

The base station 12 may be a network-side device in the radio communication system. The radio communication system may be the 4th generation mobile communication technology (4G) system, also referred to as a long-term evolution (LTE) system; or, the radio communication system may also be a 5G system, also referred to as a NR (new radio) system or a 5G NR system. Or the radio communication system may also be a next-generation system of the 5G system. An access network in the 5G system may be referred to as an NG-RAN (new generation radio access network).

The base station 12 may be an evolved base station (eNB) used in the 4G system. Or the base station 12 may also be a base station using a centralized distribution architecture (gNB) in the 5G system. When the base station 12 uses the concentrated distribution architecture, a central unit (CU) and at least two distributed units (DU) are usually included. The central unit is provided with protocol stacks of a packet data convergence protocol (PDCP) stratum, a radio link control (RLC) protocol stratum, and a media access control (MAC) stratum; and the distributed unit is provided with a protocol stack of a physical (PHY) stratum, and the examples of the present disclosure do not limit the specific implementations of the base station 12.

Radio connection between the base station 12 and the terminal 11 may be established by means of a radio air interface. In different implementations, the wireless air interface is a wireless air interface based on the fourth generation mobile communication network technology (4G) standard, or the wireless air interface is a wireless air interface based on the fifth generation mobile communication network technology (5G) standard, for example, the wireless air interface is a new radio; or the wireless air interface may also be a wireless air interface based on a further next generation mobile communication network technology standard of 5G.

In some examples, an end-to-end (E2E) connection may further be established between the terminals 11, for example, in scenarios such as vehicle-to-vehicle (V2V) communication, vehicle-to-infrastructure (V2I) communication, and vehicle-to-pedestrian (V2P) communication in vehicle-to-everything (V2X) communication.

In some examples, the above radio communication system further includes a network management device 13.

A plurality of base station 12 are connected with the network management device 13 respectively, where the network management device 13 may be a core network device of the radio communication system, for example, the network management device 13 may be a mobility management entity (MME) in an evolved packet core network (EPC), Or the network management device may also be other core network devices, such as a serving gateway (SGW), a public data network gateway (PGW), a policy and charging rules function (PCRF) unit, or a home subscriber server (HSS). The examples of the present disclosure do not limit an implementation form of the network management device 13.

In 5G NR, for idle UE and inactive UE, when the network has data to send to the UE, an RA (Registration Area) concept is introduced so that the network can page the UE and send the data to the UE. An RA is defined as a set of TAs. Each TA contains one or more cells, corresponding to a certain geographic area.

In some examples, each TA is identified by TAI (TA Identity). The TAI includes a PLMN (Public Land Mobile Network) and a TAC. The network sends the PLMN and the TAC to the UE by system information broadcast. A plurality of TAs is configured for the UE over the network. That is, the network configures a TAI list for the UE.

When the UE moves from TA1 (Tracking Area 1) to TA2 (Tracking Area 2), if the TA2 is not in the TAI list that is configured for the UE by the network, the UE needs to perform TAU or RAU (Registration Area Update) so that the network configures a new TAI list for the UE to ensure that the network can track the UE.

For TNs (Terrestrial Networks), if the UE does not move, the TAC identified by the UE and broadcast by the network will not change, and the UE will not perform TAU. For an NTN, even if the UE does not move, the TAC of the network received by the UE will change due to satellite movement, so the UE needs to perform TAU, resulting in unnecessary signaling overhead and energy consumption.

The examples of the present disclosure relate to the field of radio communications but are not limited to the field of radio communications, and, in particular, to a tracking area update method and apparatus, a communication device, and a storage medium.

In the 5G NR (New Radio) protocol, for idle UE (User Equipment) and inactive UE, when the network has data to send to the UE, a paging message needs to be broadcast in a tracing area in which the UE is located to page the UE and send the data to the UE.

In a case where the TA of the UE changes due to the movement of the UE or satellites, the UE needs to perform TAU so that the network can track the UE.

The present disclosure provides a tracking area update method and apparatus, a communication device, and a storage medium.

According to a first aspect of examples of the present disclosure, a tracking area update method, performed by the UE, is provided and includes reporting auxiliary information that includes location information and movement information of the UE. The auxiliary information is configured to determine whether the UE is located within a boundary of two Tracking Areas by a core network.

In some examples, the method further includes the step of receiving, from a base station, TA (Tracking Area) indication information determined by the core network according to the auxiliary information and the step of performing TAU (Tracking Area Update) according to the TA indication information.

In some examples, performing TAU according to the TA indication information includes receiving a SIB (System Information Block) from the base station according to the TA indication information and performing the TAU according to the SIB.

In some examples, performing the TAU according to the SIB includes acquiring changed information of TAC (Tracking Area Code) from the SIB and performing the TAU according to the changed information.

In some examples, the TA indication information includes boundary indication information for indicating the boundary of the two TAs.

The step of receiving the SIB from the base station according to the TA indication information includes receiving the SIB broadcast by the base station in response to determining that the UE is located in the boundary according to the boundary indication information and the location information of the UE.

In some examples, the boundary indication information includes at least one of: boundary area range information for indicating an area range that includes the boundary, or boundary indication information for indicating that the UE is located in the boundary.

In some examples, the TA indication information includes TA information that includes a parameter for triggering the UE to perform the TAU. The step of receiving the SIB from the base station according to the TA indication information includes receiving the SIB from the base station according to the TA information.

In some examples, the TA information includes a TAC and a TAC change waiting time. The TAC change waiting time is determined by the core network according to ephemeris information of a satellite corresponding to the base station and the auxiliary information. The step of receiving the SIB from the base station, according to the TA information, includes receiving, according to the TAC change waiting time, the SIB broadcast by the base station during a predetermined time period, including a waiting end time of the TAC change waiting time.

In some examples, the auxiliary information reported by the UE is further configured to determine a TA for broadcasting a paging message of the UE by the core network.

According to a second aspect of the examples of the present disclosure, a tracking area update method, performed by the UE, is provided and includes receiving TA indication information sent by a core network and performing TAU according to the TA indication information.

In some examples, performing TAU according to the TA indication information includes receiving a SIB from a base station according to the TA indication information and performing the TAU according to the SIB.

In some examples, performing the TAU according to the SIB includes acquiring changed information of TAC from the SIB and performing the TAU according to the changed information.

In some examples, the TA indication information includes boundary indication information for indicating a boundary of at least two TAs.

The step of receiving the SIB from the base station according to the TA indication information includes receiving the SIB broadcast by the base station in response to determining that the UE is located in the boundary, according to the boundary indication information and the location information of the UE.

In some examples, the boundary indication information includes boundary area range information for indicating an area range that includes the boundary.

According to a third aspect of the examples of the present disclosure, provided is a tracking area update method, performed by a core network and including receiving auxiliary information, the auxiliary information includes location information and movement information of the UE. The auxiliary information is configured to determine whether the UE is located within a boundary of two Tracking Areas by a core network.

In some examples, the method further includes determining a TA in which the UE is located according to the auxiliary information in response to determining that failure to page the UE and broadcasting a paging message for the UE in the TA in which the UE is currently located.

In some examples, the method further includes sending TA indication information in response to receiving the auxiliary information.

In some examples, the TA indication information includes boundary indication information for indicating a boundary of the two TAs.

In some examples, the boundary indication information includes at least one of boundary area range information for indicating an area range that includes the boundary or boundary indication information for indicating that the UE is located in the boundary.

In some examples, the TA indication information includes TA information that includes a parameter for triggering the UE to perform TAU.

In some examples, the TA information includes a TAC and a TAC change waiting time. The TA information is configured to indicate to the UE to perform the TAU according to the TAC within the TAC change waiting time.

In some examples, the method further includes determining the TAC change waiting time according to ephemeris information of a satellite corresponding to a base station and the auxiliary information.

According to a fourth aspect of the examples of the present disclosure, a tracking area update method, performed by a core network, is provided and includes sending TA indication information that is at least configured to indicate to the UE to perform TAU.

In some examples, the TA indication information includes boundary indication information for indicating a boundary of two TAs.

In some examples, the method further includes sending an SIB by the base station through broadcasting, the SIB being configured to indicate UE to perform the TAU in response to determining that the UE is located in the boundary of the two TAs according to the boundary indication information.

In some examples, the boundary indication information includes boundary area range information for indicating an area range that includes the boundary.

According to a fifth aspect of the examples of the present disclosure, a tracking area update apparatus, applied to the UE, is provided and includes a first reporting module that is configured to report auxiliary information that includes location information and movement information of the UE. The auxiliary information is configured to determine whether the UE is located within a boundary of two Tracking Areas by a core network.

In some examples, the apparatus further includes a first receiving module that is configured to receive, from a base station, TA indication information determined by the core network according to the auxiliary information and a first updating module that is configured to perform TAU according to the TA indication information.

In some examples, the first updating module includes a first receiving submodule that is configured to receive an SIB from the base station according to the TA indication information and a first updating submodule that is configured to perform the TAU according to the SIB.

In some examples, the first updating submodule includes a first acquisition submodule that is configured to acquire changed information of TAC from the SIB and a second updating submodule that is configured to perform the TAU according to the changed information.

In some examples, the TA indication information includes boundary indication information for indicating the boundary of the two TAs.

In some examples, the first receiving submodule is specifically configured to receive the SIB broadcast by the base station in response to determining that the UE is located in the boundary according to the boundary indication information and the location information of the UE.

In some examples, the boundary indication information includes at least one of: boundary area range information for indicating an area range that includes the boundary, or boundary indication information for indicating that the UE is located in the boundary.

In some examples, the TA indication information includes TA information that includes a parameter for triggering the UE to perform TAU.

In some examples, the first receiving submodule is specifically configured to receive the SIB from the base station according to the TA information.

In some examples, the TA information includes a TAC and a TAC change waiting time. The TAC change waiting time is determined by the core network according to ephemeris information of a satellite corresponding to the base station and the auxiliary information.

In some examples, the first receiving submodule is specifically configured to receive, according to the TAC change waiting time, the SIB broadcast by the base station during a predetermined time period, including a waiting end time of the TAC change waiting time In some examples, the auxiliary information reported by the UE is further configured to determine a TA for broadcasting a paging message of the UE by the core network.

According to a sixth aspect of the examples of the present disclosure, a tracking area update apparatus, applied to the UE, is provided and includes a second receiving module that is configured to receive TA indication information sent by a core network and a third updating module that is configured to perform TAU according to the TA indication information.

In some examples, the third updating module includes a second receiving submodule that is configured to receive a SIB from a base station according to the TA indication information and a third updating submodule that is configured to perform the TAU according to the SIB.

In some examples, the third updating submodule includes a second acquisition submodule that is configured to acquire changed information of TAC from the SIB and a fourth updating submodule that is configured to perform the TAU according to the changed information.

In some examples, the TA indication information includes boundary indication information for indicating a boundary of at least two TAs.

In some examples, the second receiving submodule is specifically configured to receive the SIB broadcast by the base station in response to determining that the UE is located in the boundary according to the boundary indication information and the location information of the UE.

In some examples, the boundary indication information includes boundary area range information for indicating an area range that includes the boundary.

According to a seventh aspect of the examples of the present disclosure, a tracking area update apparatus, applied to a core network, is provided and includes a third receiving module that is configured to receive auxiliary information that includes location information and movement information of UE. The auxiliary information is configured to determine whether the UE is located within a boundary of two Tracking Areas by a core network.

In some examples, the apparatus further includes a first determining module that is configured to determine a TA in which the UE is located according to the auxiliary information in response to determining that failure to page the UE and a first sending module that is configured to broadcast a paging message for the UE in the TA in which the UE is currently located.

In some examples, the apparatus further includes a second sending module that is configured to send TA indication information in response to receiving the auxiliary information.

In some examples, the TA indication information includes boundary indication information for indicating a boundary of the two TAs.

In some examples, the boundary indication information includes at least one of: boundary area range information for indicating an area range that includes the boundary or boundary indication information for indicating that the UE is located in the boundary.

In some examples, the TA indication information includes TA information that includes a parameter for triggering the UE to perform TAU.

In some examples, the TA information includes a TAC and a TAC change waiting time. The TA information is configured to indicate to the UE to perform the TAU according to the TAC within the TAC change waiting time.

In some examples, the apparatus further includes a second determining module that is configured to determine the TAC change waiting time according to ephemeris information of a satellite corresponding to a base station and the auxiliary information.

According to an eighth aspect of the examples of the present disclosure, a tracking area update apparatus, applied to a core network, is provided and includes a third sending module that is configured to send TA indication information that is at least configured to indicate to the UE to perform TAU.

In some examples, the TA indication information includes boundary indication information for indicating a boundary of two TAs.

In some examples, the apparatus further includes a fourth sending module that is configured to send an SIB by the base station through broadcasting. The SIB is configured to indicate to the UE to perform the TAU in response to determining that the UE is located in the boundary of the two TAs according to the boundary indication information.

In some examples, the boundary indication information includes boundary area range information for indicating an area range that includes the boundary.

According to a ninth aspect of the examples of the present disclosure, a communication device is provided and includes a processor and a memory for storing executable instructions capable of running on the processor, where, in response to determining that the processor is configured to run the executable instructions, the executable instructions execute the steps in any of the tracking area update methods described above.

According to a tenth aspect of the examples of the present disclosure, a non-temporary computer-readable storage medium storing computer-executable instructions is provided, and the steps of the tracking area update method are implemented in response to determining that the computer-executable instructions are executed by a processor.

In the examples of the present disclosure, the UE reports the auxiliary information to inform the core network of its own location and movement information to facilitate the core network in determining whether the UE is located in the boundary of two TAs. In this way, failures in data interaction with the UE, such as paging failure, caused when the UE fails to update the TAs in time or the core network does not know whether the UE is located in the boundary of the two TAs, can be reduced, and the paging success rate can be improved.

Figure 2:
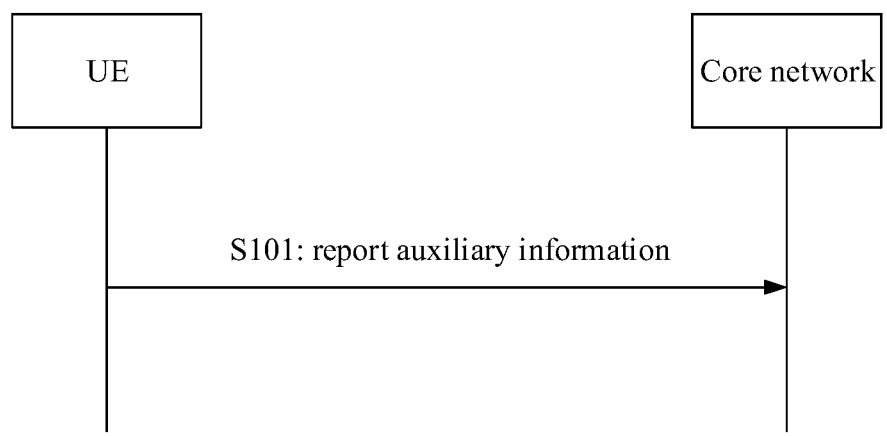
FIG. 2 is a first schematic flowchart of a tracking area update method, according to an example.

As shown in FIG. 2, an example of the present disclosure provides a tracking area update method, performed by the UE, and includes step S101, which is reporting auxiliary information that includes location information and movement information of the UE. The auxiliary information is configured to determine whether the UE is located within a boundary of two Tracking Areas by a core network.

Figure 3:
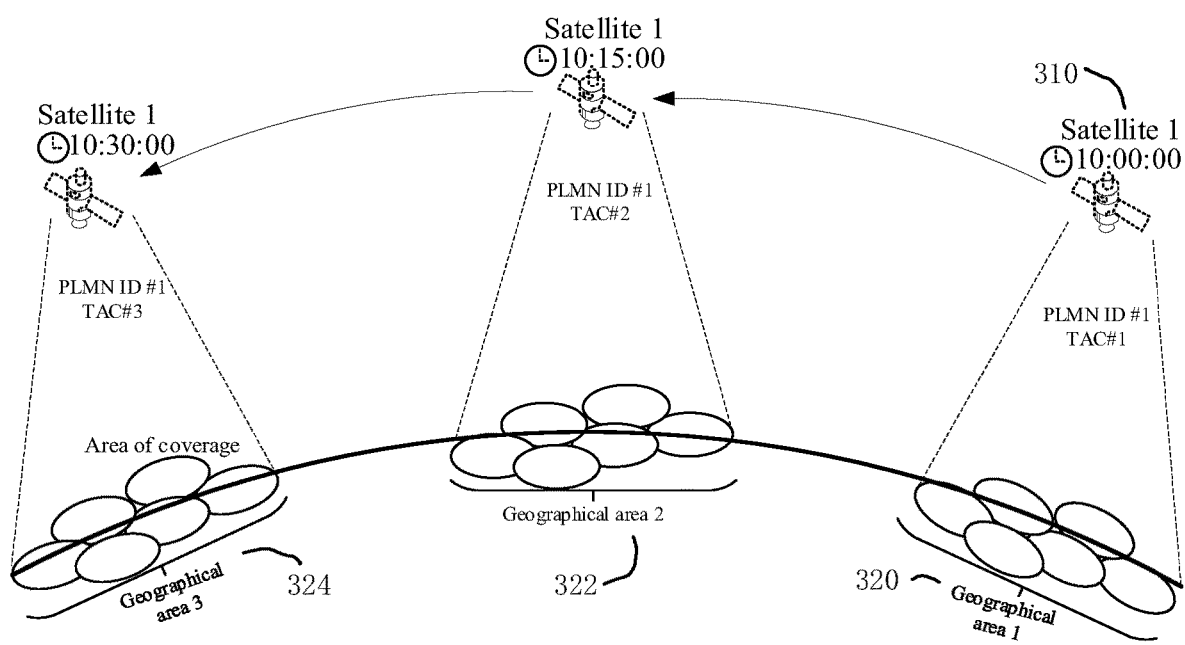
FIG. 3 is a schematic diagram of the location of satellite coverage TA (Tracking Area) at different times in NTN (Non-Terrestrial Networks), according to an example.

In an example, considering the characteristics of satellite rotation relative to the Earth in the NTN, a fixed TA solution can be used for the NTN to reduce frequent TAU and RAU of the UE caused by satellite movement, which can be achieved as follows: For an NTN NGSO (non-geostationary orbit satellite), when the satellite moves from one area to another area, the TAC broadcast by the satellite also correspondingly change, as shown in FIG. 3.

The number of PLMN corresponding to satellite 1 is fixed. That is, satellite 1 corresponds to PLMN ID #1. The satellite 1 310 broadcasts a TAC of TAC1 when covering geographical area 1 320, a TAC of TAC2 when moving to geographical area 2 322, and a TAC of TAC3 when moving to geographical area 3 324. By such a design, frequent TAU can be suppressed. For example, when the UE is in the geographical area 2, TACs identified by the UE from the network are all TAC2, so as long as the UE does not move out of area 2, TAU is not needed.

Figure 4:
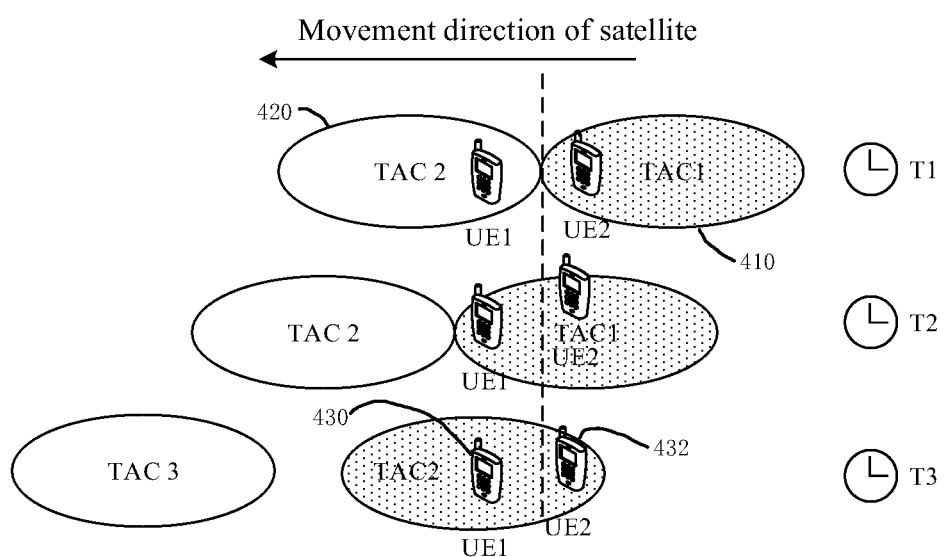
FIG. 4 is a first schematic diagram of a change of a TA in which a UE is located, according to an example.

However, when UE1 is located on the left side of the boundary of the fixed TAs, it may face the following problem, where, at time T1, the TAC identified by the UE is TAC2, while at time T2, the TAC identified by the UE is TAC1. In this case, the UE may need to perform TAU. At time T3, the TAC identified by the UE is TAC2, and in this case, the UE may need to perform TAU again, as shown in FIG. 4.

Assuming that there is only TAC2 420 in the TAI list configured by the network for UE1 430 and only TAC1 410 in the TAI list configured for UE2 432, then at time T2, when UE1 reselects the current service cell and identifies the TAC of the current service cell as TAC1, UE1 carries out TAU. At time T3, the TAC broadcast by the service cell of UEL changes from TAC1 to TAC2. If the network does not instruct the UE to update the system information in this case, and UE1 does not read the updated system information, then UE1 does not identify that the TAC broadcast by the service cell changes from TAC1 to TAC2, and then UE1 does not perform TAU. If the network needs to page UE1 in this case, UE1 may not be paged because at this moment, the network considers the TA in which UE1 is located to be TAC1, so UE1 will be paged in the cell corresponding to TAC1, specifically corresponding to the cell marked by shadow in FIG. 4 above. If the network instructs to update system information and sends a paging message to the UE after the change of TAC, the paging message overhead is increased. In addition, since the network fails to identify the above UE1 behavior of not performing TAU as an abnormal behavior, between time T2 and time T3, UE1 has moved to the TA corresponding to TAC1; that is, at time T3, UE1 is indeed not in the TA corresponding to TAC2, and TAU is not needed. Then this network can page UE1. In this way, the fixed TA solution for the NTN may still lead to the problem that the network fails to page the UE under certain circumstances.

In the examples of the present disclosure, UE can avoid missing TAU by reporting auxiliary information during registration. For example, the UE may include the auxiliary information in a registration request message.

Here, the auxiliary information can include the location information and movement information of the UE. After the UE reports its own location information and movement information to a base station, the base station can determine the location of the UE when paging the UE, and then determine whether the UE is located in the boundary of the TAs. In one example, the UE may carry and send the above auxiliary information by means of the registration request message and the like, or in another example, the UE may send the above auxiliary information separately.

In the examples of the present disclosure, the boundary includes an area range in the movement direction of the satellite. Because satellites are always in relative motion with the Earth, and by means of the fixed TAs and the actual geographical area range, each satellite may cover different TAs simultaneously, the actual area of TAs here will move together with the satellites within a period of time. As shown in FIG. 3, since during movement relative to the land, a satellite (satellite 1) will switch the TAC broadcast by the satellite itself after moving for a period of time (10:00:00 to 10:15:00 to 10:30:00), the actual TA will change relative to the geographical area range, so that the geographical area in which the boundary is located (i.e. Geographical area 1 at 10:00:00, Geographical area 2 at 10:15:00 and Geographical area 3 at 10:30:00) belongs to different TAs at different times.

In an example, the above location information includes the current position coordinates of the UE and the like, and the movement information of the UE may include the movement status information of the UE, for example, movement status information indicating rest or motion, information indicating the speed or movement speed (e.g., accelerated movement speed) of UE (i.e., the movement status information), and information indicating the movement direction of the UE, etc.

In another example, the above auxiliary information may also include type information of the UE, for example, the UE is a handheld mobile terminal, a vehicle-mounted terminal, or the like.

If the UE is determined to be located in the boundary based on the above auxiliary information, then the handoff of TAC may occur with the movement of the UE and rotation of the satellite. In this case, the core network can re-determine the TA in which the UE is located according to the auxiliary information and send TA indication information to the UE so that the UE acquires the system information to perform TAU; or, the core network can determine the location of the UE according to the auxiliary information of the UE and make paging based on the TAC of the determined location.

In this way, through the auxiliary information reported by the UE, the core network can determine whether the UE enters the boundary of different TAs, and can send TA indication information to the UE according to the auxiliary information to instruct the UE to perform TAU and the like, so as to avoid the problem that the UE fails to perform TAU due to missing system information. In this way, data interaction anomalies caused by the core network not knowing the location of the UE are reduced, and the success rate of paging the UE is improved. According to the auxiliary information reported by the UE, the core network can determine that the UE enters the boundary of different TAs, and only sends TA indication information to the UE located in the boundary of different TAs.

In some examples, the method further includes the step of receiving, from a base station, TA (Tracking Area) indication information determined by the core network, according to the auxiliary information and the step of performing TAU (Tracking Area Update), according to the TA indication information.

In the examples of the present disclosure, after the UE reports auxiliary information to the core network, the core network can determine a position relationship between the UE and different TAs according to the auxiliary information. For example, the core network can determine whether the UE is located in the boundary of TAs or how long it takes for the UE to enter the boundary of TAs. When determining that the UE is located in the boundary of different TAs, the core network sends TA indication information to the UE.

In the examples of the present disclosure, the core network may include the TA indication information in a registration accept message.

The UE can receive the TA indication information sent by the core network from the base station. The TA indication information can be used to instruct the UE to perform TAU, or to indicate whether the location of the UE is the boundary of TAs, and the UE can determine whether to perform TAU and when to perform TAU according to this indication.

In some examples, performing TAU according to the TA indication information includes the step of receiving an SIB from the base station according to the TA indication information and the step of performing the TAU according to the SIB.

In the examples of the present disclosure, the UE receives the TA indication information, and the UE needs to further acquire the SIB broadcasted by the base station to determine when to perform TAU if the UE determines that TAU is needed. For example, the UE acquires the updated TAC from the SIB broadcast by the base station.

In some examples, performing the TAU according to the SIB includes acquiring changed information of TAC from the SIB and performing the TAU according to the changed information.

In the examples of the present disclosure, since the above SIB carries information such as the TAC of the TA of the UE in the boundary, by receiving the SIB, the UE can acquire the changed information of TAC in the SIB and perform the TAU according to the changed information.

In this way, the UE can timely acquire system information broadcast by the base station in response to determining that the UE itself is within the boundary, and the situation of missing TAU due to failure to read the updated system information can be reduced.

In some examples, the TA indication information includes boundary indication information for indicating the boundary of the two TAs.

The step of receiving the SIB from the base station according to the TA indication information includes receiving the SIB broadcast by the base station in response to determining that the UE is located in the boundary according to the boundary indication information and the location information of the UE.

In the examples of the present disclosure, the boundary indication information is used by the core network to determine the boundary according to the position relationship of different TAs and information such as the satellite ephemeris corresponding to the base station, and the boundary indication information is sent to the UE. After receiving the boundary indication information, the UE can determine whether the UE itself is located in the boundary of TAs according to the boundary indicated by the boundary indication information and the location of the UE.

The UE has reported the auxiliary information to the base station, and the core network can also directly determine whether the UE is located in the boundary according to the auxiliary information and the above boundary indication information, and inform the UE. The UE then determines whether the UE itself is located in the boundary according to the boundary indication information received.

The case where the UE determines that the UE itself is located in the boundary means that the TAC broadcast by the base station in the system information may change at this time. In this case, the UE needs to continuously receive the SIBs broadcast by the base station and acquire the changed information of TAC in the SIBs to update the TA. In this way, the problem that UE misses the changed TAC in the system information because the base station does not send the system information update indication can be avoided.

In some examples, the boundary indication information includes at least one of: boundary area range information for indicating an area range that includes the boundary, or boundary indication information for indicating that the UE is located in the boundary.

In this context, the boundary area range information is used to indicate the range of the boundary area of different TAs. After the core network sends the boundary area range information to the UE, within a period of time, the UE can determine whether it is within the boundary area range according to its own location, and then determine whether to read the system information broadcast by the base station.

In addition, since the core network can determine whether the UE is located in the boundary according to the auxiliary information reported by the UE, the core network can inform the UE that the UE is located in the boundary by directly sending the boundary indication information. In this way, regarding the fact that signaling overhead can be reduced by means of the boundary area range indication, the indication also has the problem of timeliness.

In the examples of the present disclosure, the core network can also send the above boundary area range information and boundary indication information to the UE through the TA indication information. In this way, the UE can know that the UE itself is located in the boundary according to the TA boundary indication information received. Meanwhile, the UE can determine whether the UE itself is located in the boundary or further determine the position relationship between the location of the UE and the boundary according to the above boundary area range information, i.e., the location information of the UE.

In addition, the UE can also save the acquired boundary area range information and re-determine whether the UE itself is located in the boundary in the case where the UE itself moves later.

In some examples, the TA indication information includes TA information that includes parameters that trigger the UE to perform TAU. The step of receiving the SIB from the base station according to the TA indication information includes receiving the SIB from the base station according to the TA information.

In the examples of the present disclosure, the auxiliary information reported by the UE can be used for the base station to send the corresponding TA information, and the TA information can be configured to trigger the UE to perform the TAU and include the parameters for the TAU.

In this context, the parameters for the TAU are parameters required by the UE for the TAU, including the identity information of the TA to be updated, for example, TAI, the changed information of TAC, and the area range of the TA to be updated.

For example, the core network determines, according to the auxiliary information, that the UE is located within the boundary of different TAs, or the core network determines, according to the auxiliary information, that the UE will enter the above boundary after a predetermined time. In this case, the core network can provide the UE with information such as a TAI list configured for TAU, the TAC corresponding to each TA in the TAI list, and the time when the TAC changes to prevent the situation where the UE fails to perform TAU in time because of missing the change of TAC when the UE moves to the boundary.

In some examples, the TA information includes a TAC and a TAC change waiting time. The TAC change waiting time is determined by the core network according to ephemeris information of a satellite corresponding to the base station and the auxiliary information. The step of receiving the SIB from the base station according to the TA information includes receiving, according to the TAC change waiting time, the SIB broadcast by the base station during a predetermined time period, including a waiting end time of the TAC change waiting time.

In the example of the present disclosure, the UE receives TA information. The TA information sent by a core network according to the auxiliary information includes a TAC and TAC change waiting time. That is, the core network can determine the waiting time for the UE to perform TAU according to the location and movement information of the UE, and ephemeris information of a satellite corresponding to the base station. In this way, after moving for a period of time, the UE can perform the TAU when the above TAC change waiting time is over.

It should be noted that the above TAC change waiting time is determined according to the change law of the TAs and the movement law of the UE. According to the ephemeris information of the satellite, the core network can learn the law of tracking area movement generated by the satellite movement, and determine the movement law of the UE according to the above auxiliary information reported by the UE, so as to determine the TAC change waiting time required by the UE.

For idle UE, the UE is not required to continuously read SIBs, so the UE may miss reading the SIB carrying the changed information of TAC. In this context, the UE can start to receive SIBs either before the waiting end time of the above TAC change waiting time or at the waiting end time. In conclusion, the purpose of receiving SIBs within the above predetermined time period is to receive a SIB including the changed information of TAC within the predetermined time period, as far as possible, to perform TAU according to the relevant changed information.

The predetermined time period here includes at least the waiting end time and a period of time before the waiting end time, and during the predetermined time period, the UE continuously read SIBs, so as to be able to read the SIB carrying the changed information of TAC.

During the movement of the UE, in response to determining the reception of the TA information sent by the base station, the UE may wait for a period of time according to the TA information and perform the TAU according to the TAC and other information within the predetermined time period, including the waiting end time of the TAC change waiting time. In this way, even if the UE does not acquire the updated system information when entering the boundary of different TAs, the UE can also directly perform the TAU to reduce the situation where the UE fails to receive the paging message from the base station because the UE misses the updated system information and does not perform the TAU.

In another example, the UE maintains the current TA without the need for TAU until the end of the waiting time, and in this way, the ping-pong switching of the UE between different TAs can be reduced.

In the examples of the present disclosure, the TA information that the UE receives from the base station according to the auxiliary information includes the TAC and the TAC change waiting time. In this way, the UE can wait for a period of time according to the TA information and acquire the changed information of TAC for TAU from the base station after the above waiting time is over. For example, after the waiting time is over, the UE starts to continuously receive the SIBs broadcast by the base station and then acquires the above changed information, including the relevant information of the changes in the TAs, such as TAC, through the SIBs, and then carries out the TAU.

In this way, the UE can acquire the changed information of TAC from the SIBs sent by the base station when entering the boundary of different TAs to perform the TAU in time. In this way, the situation of missing TAU due to UE's failure to receive SIBs in time at the boundary of TAs.

In some examples, the auxiliary information reported by the UE is further configured to determine a TA for broadcasting a paging message of the UE by the core network.

In the examples of the present disclosure, the auxiliary information reported by the UE can also be configured to determine the location of the UE and determine the corresponding TA when the UE needs to be paged by the core network to broadcast the paging message in the TA in which the UE is located. This also reduces the number of paging failures.

Figure 5:
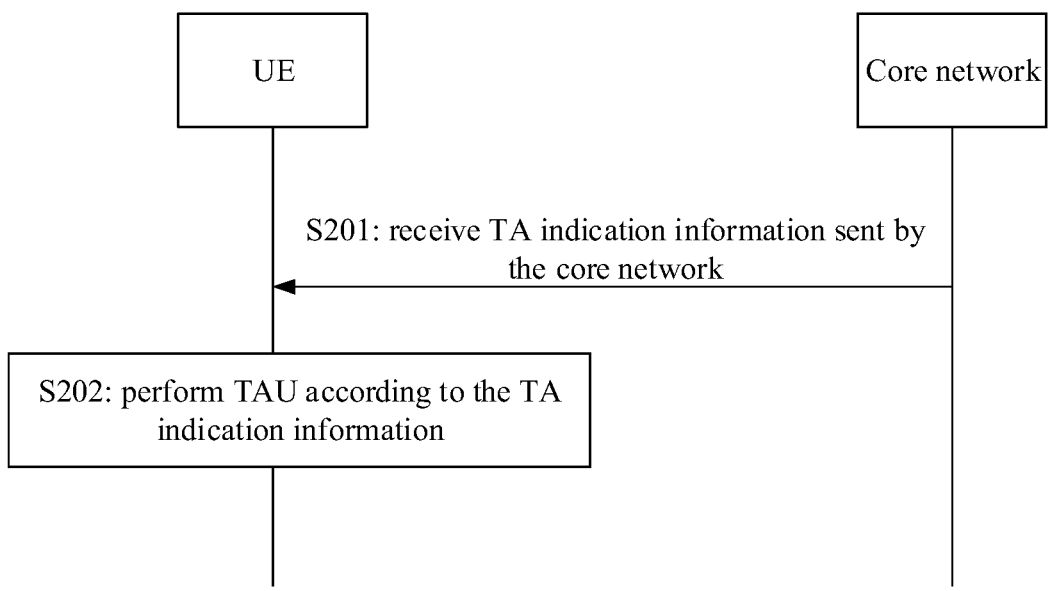
FIG. 5 is a second schematic flowchart of a tracking area update method, according to an example.

As shown in FIG. 5, an example of the present disclosure further provides a tracking area update method, performed by UE, and includes step S201, which is receiving TA indication information sent by a core network, and step S202, which is performing TAU according to the TA indication information.

In the examples of the present disclosure, the UE can directly receive the TA indication information provided by the core network, determine whether the UE itself is located in the boundary of TAs according to the TA indication information, and then carries out the TAU according to the TA indication information. That is, the UE does not need to report its own location information and movement information to the core network, but directly acquires the distribution of the boundary of TAs and other information from the core network, and then the UE can determine whether to perform the TAU.

In the examples of the present disclosure, the UE receives the TA indication information from the core network independently of whether auxiliary information is reported. That is, at any time before or after reporting the auxiliary information, or if the UE does not report the auxiliary information, the UE can receive the TA indication information and determine whether the UE itself is located in the boundary according to the location information of the UE. In this case, the TA indication information does not include the relevant information about the UE itself. That is, the core network cannot know the actual location of the UE in this case, but only informs the UE of the position relationship of TAs, such as a TA boundary area. The UE determines whether its location is in the TA boundary area according to the location information of the UE and the position relationship of TAs.

In this way, all UEs in a cell will receive the above indication information, so all the UEs need to determine whether the UEs are located in the boundary of TAs.

In the examples of the present disclosure, the core network may include the TA indication information in a registration accept message.

In this way, TAU can be performed by receiving the information provided by the core network, which can reduce the situation of missing TAU and also reduce the failures in paging the UE.

In some examples, performing TAU according to the TA indication information includes receiving a SIB from a base station according to the TA indication information and performing the TAU according to the SIB.

In the examples of the present disclosure, after receiving the above TA indication information, the UE needs to further acquire the SIB broadcast by the base station to determine when to perform TAU, if the UE determines that TAU is needed. For example, the UE acquires the updated TAC from the SIB broadcast by the base station.

In some examples, performing the TAU according to the SIB includes acquiring changed information of TAC from the SIB and performing the TAU according to the changed information.

In the examples of the present disclosure, since the above SIB carries information such as the TAC of the boundary of different TAs, by receiving the SIB, the UE can acquire the changed information of TAC in the SIB and perform the TAU according to the changed information.

In this way, the UE can timely acquire system information broadcast by the base station in response to determining that the UE itself is within the boundary, and the situation of missing TAU due to failure to read the updated system information can be reduced.

In some examples, the TA indication information includes boundary indication information for indicating a boundary of at least two TAs.

The step of receiving the SIB from the base station according to the TA indication information includes receiving the SIB broadcast by the base station in response to determining that the UE is located in the boundary according to the boundary indication information and the location information of the UE.

In the examples of the present disclosure, the TA indication information is used by the core network to determine the boundary according to the position relationship of different TAs and the satellite ephemeris information corresponding to the base station, and the boundary indication information is sent to the UE. After receiving the TA indication information, the UE can determine whether the UE itself is located in the boundary of TAs according to the boundary indicated by the boundary indication information and the location of the UE.

In response to determining that the UE is located in the boundary, the UE receives SIBs from the base station and acquires relevant information required for TAU from the SIBs to perform the TAU.

In some examples, the boundary indication information includes boundary area range information for indicating an area range that includes the boundary.

In this context, the boundary area range information is used to indicate the range of the boundary area of different TAs. After the core network sends the boundary area range information to the UE, within a period of time, the UE can determine whether it is within the boundary area range according to its own location, and then determine whether to read the system information broadcast by the base station.

Figure 6:
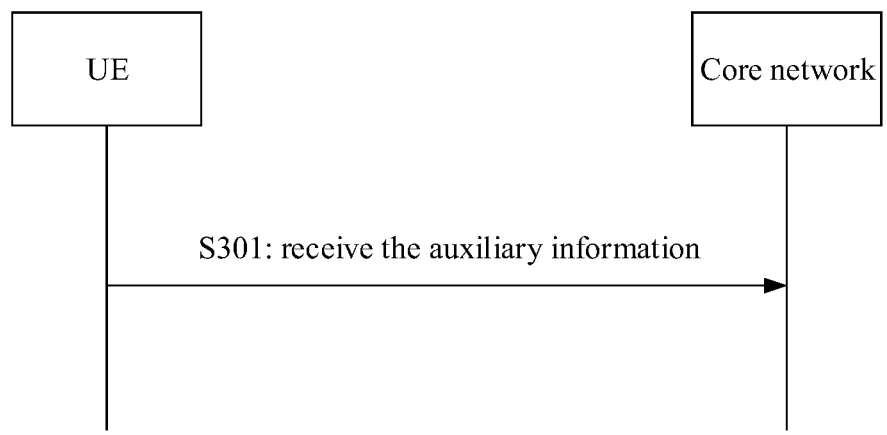
FIG. 6 is a third schematic flowchart of a tracking area update method, according to an example.

As shown in FIG. 6, an example of the present disclosure further provides a tracking area update method, performed by a core network, and includes step S301, which is receiving auxiliary information that includes location information and movement information of UE. The auxiliary information is configured to determine whether the UE is located within a boundary of two Tracking Areas by a core network.

In the examples of the present disclosure, the core network receives the auxiliary information reported by the UE to determine information about the location of the UE in a TA and the movement direction and movement speed of the UE, and then the core network can determine a position relationship between the UE and different TA areas. For example, the core network can determine whether the UE is located in the boundary of TAs or how long it takes for the UE to enter the boundary of TAs.

In response to determining that the UE is located in the boundary of TAs, the UE may need to perform TAU, and then the core network sends TA indication information to the UE located at the boundary of TAs.

In some examples, when the UE is located at the boundary of TAs, the core network can also broadcast a paging message in two adjacent TAs at the boundary in which the UE is located through the base station. In this way, the UE can receive a paging message even if the UE moves back and forth between the two TAs.

In the examples of the present disclosure, the auxiliary information can be reported during registration of the UE to prevent the UE from missing the TAU. For example, the UE may include the auxiliary information in a registration request message.

In this way, by receiving the auxiliary information reported by the UE, the core network can determine whether the UE enters the boundary of different TAs, and can send the TA indication information to the UE according to the auxiliary information to avoid the problem that the UE fails to perform TAU due to missing system information. In this way, data interaction anomalies caused by the core network not knowing the location of the UE are reduced, and the success rate of paging the UE is improved. According to the auxiliary information reported by the UE, the core network can determine that the UE enters the boundary of different TAs, and only sends TA indication information to the UE located in the boundary of different TAs.

In some examples, the method further includes determining a TA in which the UE is located, according to the auxiliary information in response to determining that paging the UE failed, and broadcasting a paging message for the UE in the TA in which the UE is currently located.

In the example of the present disclosure, in the case of broadcasting the paging message, the core network can determine the TA in which the UE is located according to the auxiliary information reported by the UE, and then broadcast the paging message within the TA to reduce paging failures. For example, in the case where the TAC broadcast by the network changes and the current TAC is no longer in the TAI list of the UE, in response to determining that the UE does not perform TAU, the network may not be able to page the UE through the cell corresponding to the previous TA. In this case, the network can determine a cell corresponding to the current location of the UE according to the above auxiliary information, and then page the UE again through the determined cell.

In some examples, the method further includes sending TA indication information in response to receiving the auxiliary information.

In some examples, the TA indication information includes boundary indication information for indicating a boundary of the two TAs.

In this context, when determining that the UE is located in the boundary of different TAs, the core network sends TA indication information to the UE. After receiving the auxiliary information reported by the UE, the core network can send corresponding TA indication information to the UE according to the auxiliary information. For example, the core network informs the UE that the UE is located in the boundary and provides the information that the UE needs to perform the TAU. Or, the core network determines, according to information such as the location information and movement information of the UE and the movement law of satellites, that the UE enters the boundary after waiting for a predetermined time and needs to perform the TAU.

In the examples of the present disclosure, the core network may include the TA indication information in a registration accept message.

In some examples, the boundary indication information includes boundary area range information for indicating an area range that includes the boundary or boundary indication information for indicating that the UE is located in the boundary.

In this context, the boundary area range information is used to indicate the range of the boundary area of different TAs. After the core network sends the boundary area range information to the UE, within a period of time, the UE can determine whether it is within the boundary area range according to its own location, and then determine whether to read the system information broadcasted by the base station.

In addition, since the core network can determine whether the UE is located in the boundary according to the auxiliary information reported by the UE, the core network can inform the UE that the UE is located in the boundary by directly sending the boundary indication information. In this way, regarding the fact that signaling overhead can be reduced by means of the boundary area range indication, the indication also has the problem of timeliness.

In some examples, the TA indication information includes TA information that includes a parameter for triggering the UE to perform TAU.

In the examples of the present disclosure, the auxiliary information reported by the UE can be configured to send the corresponding TA information by the core network, and the TA information can be configured to trigger the UE to perform the TAU and include the parameters for the TAU.

In this context, the parameters for the TAU are parameters required by the UE for the TAU, including the identity information of the TA to be updated, for example, TAI, the changed information of TAC, and the area range of the TA to be updated.

In some examples, the TA information includes a TAC and a TAC change waiting time. The TA information is configured to indicate to the UE to perform the TAU according to the TAC within the TAC change waiting time. In this case, the core network can provide the UE with information such as a TAI list configured for TAU, the TAC corresponding to each TA in the TAI list, and the time when the TAC changes to prevent the situation where the UE fails to perform TAU in time because of missing the change of TAC when the UE moves to the boundary.

In some examples, the method further includes determining the TAC change waiting time according to ephemeris information of a satellite corresponding to a base station and the auxiliary information.

In the examples of the present disclosure, the core network determines the above TAC change waiting time according to both the change law of the TAs and the movement law of the UE. The core network can determine the waiting time for the UE to perform TAU according to the location and movement information of the UE, and ephemeris information of a satellite corresponding to the base station.

Figure 7:
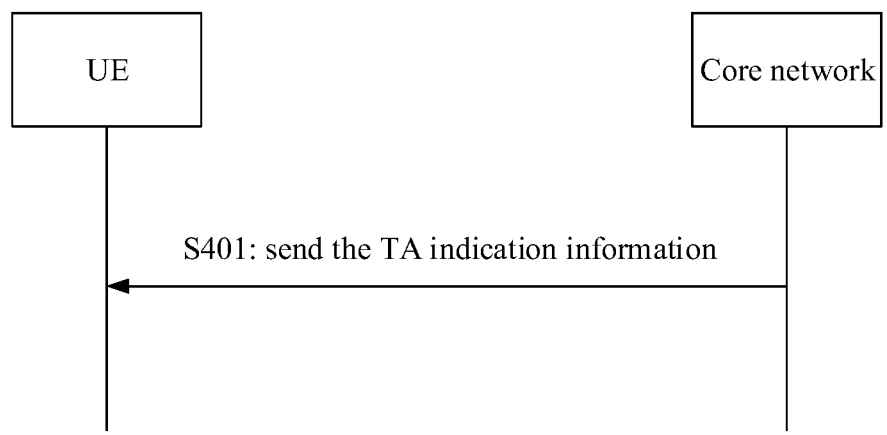
FIG. 7 is a fourth schematic flowchart of a tracking area update method, according to an example.

As shown in FIG. 7, an example of the present disclosure further provides a tracking area update method, performed by a core network and includes step S401, which is sending TA indication information that is at least configured to indicate to the UE to perform TAU.

In the examples of the present disclosure, the core network can directly send information for indicating TA-related parameters, so that the UE can determine the boundary of different TAs and determine when to perform the TAU according to its own location.

In the examples of the present disclosure, the core network may include the TA indication information in a registration accept message.

In this context, the TA indication information is sent independently of whether the UE reports the auxiliary information related to the location information or movement information of the UE, so the TA indication information can include TA distribution and the area range of the boundary of different TAs, which facilitates the UE to perform the TAU.

In this way, all UEs in a cell will receive the above indication information, so all the UEs need to determine whether the UEs are located in the boundary of TAs.

In some examples, the TA indication information includes boundary indication information for indicating a boundary of two TAs.

In some examples, the method further includes sending a SIB by the base station through broadcasting, the SIB being configured to indicate UE to perform the TAU in response to determining that the UE is located in the boundary of the two TAs according to the boundary indication information.

In the examples of the present disclosure, the core network can broadcast information carrying identities of different TAs and the like through the base station within the area range of the boundary of different TAs and provide the information to the UE. For example, the core network can provide the UE with information such as a TAI list configured for TAU and the TAC corresponding to each TA in the TAI list to prevent the situation that the UE fails to perform TAU in time because of missing the change of TAC when the UE moves to the boundary.

In some examples, the boundary indication information includes boundary area range information for indicating an area range that includes the boundary.

In this context, the boundary area range information is used to indicate the range of the boundary area of different TAs. After the core network sends the boundary area range information to the UE, within a period of time, the UE can determine whether it is within the boundary area range according to its own location, and then determine whether to read the system information broadcasted by the base station.

In some examples, UE reports auxiliary information to the base station in the network registration process, and the auxiliary information includes: 1) location information of the UE; 2) movement information of the UE, which indicates movement speed and movement direction; and 3) type of the UE, such as handheld terminal or vehicle-mounted terminal.

For example, the UE may include the auxiliary information in a registration request message.

In the network registration process of the UE, the network indicates TA boundary information to the UE. The TA boundary information, for example, the TA indication information in the above examples, includes: 1) location information, which indicates the area range, and the area is the boundary of Tas; or 2) indication information, indicating that the UE is located in the boundary of TAs.

For example, the network may include the TA boundary information in the registration accept message. Or, in the network registration process of the UE, the network configures for the UE a TA and a corresponding TAC, as well as how long it takes for the UE to identify the change of the TAC, i.e., the TAC change waiting time. The network determines the time according to the auxiliary information reported by the UE and the ephemeris information of the satellite.

In some examples, according to the auxiliary information reported by the UE, the network determines that the UE is or will be located in the boundary of TAs and sends the TA boundary information, or the TA, TAC, and change waiting time to the UE.

In response to determining that the UE receives the TA boundary information, the UE determines that the UE is located in the boundary of TAs according to its own location information and the TA boundary information, or the UE determines that the UE is located in the boundary of TAs according to the above indication information indicating that the UE is located in the boundary of TAs, then the UE continuously reads SIBI broadcast by the network to acquire changed information of TAC and then perform the TAU.

Or, in response to determining that the UE receives the TA, TAC and TAC change waiting time information, the UE reads SIBI broadcast by the network according to the time information to acquire changed information of TAC and then perform the TAU.

Or, in the case where the TAC broadcast by the network changes and the current TAC is no longer in the TAI list of the UE, in response to determining that the UE does not perform the TAU and the network fails to page the UE through the cell corresponding to the previous TA, the network can determine the cell corresponding to the current location of the UE according to the auxiliary information, and then page the UE again through the determined cell.

Figure 8:
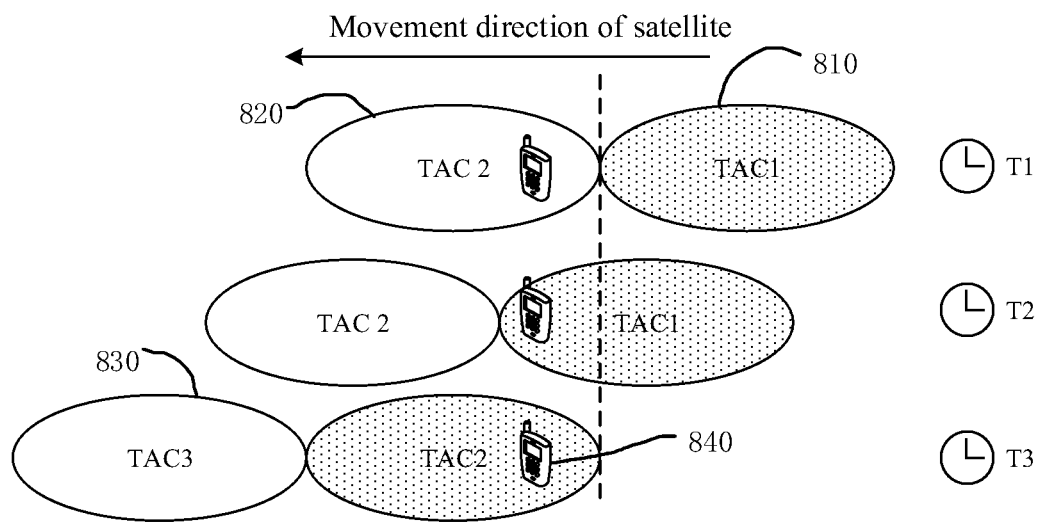
FIG. 8 is a second schematic diagram of a change of a TA in which a UE is located, according to an example.

In an example, as shown in FIG. 8, the area in which the UE 840 is located is the area of the boundary of TAs, i.e., the area of the boundary of TAC1 810 and TAC2 820. At time T1, through the network registration process of the UE, the network configures the TA for the UE as TAC2.

At time T2, the UE performs cell re-selection and finds that the TAC1 broadcast by the current cell is no longer the TA configured by the network. Then, the UE reports auxiliary information during the network registration process. The network configures a TA for the UE as TAC1 and indicates UE a time interval for changing TAC1 to TAC2. The time interval is determined according to the auxiliary information reported by the UE and the ephemeris information.

At time T3, the time interval for changing TAC1 to TAC2 is satisfied, and then the UE reads SIB 1 to acquire the changed TAC2 and completes TAU.

Or, the area in which the UE is located is the area of the boundary of TAs, i.e., the area of the boundary of TAC1 and TAC2. At time T1, through the network registration process of the UE, the network configures the TA for the UE as TAC2.

At time T2, the UE performs cell re-selection and finds that the TAC1 broadcast by the current cell is no longer the TA configured by the network. Then, the UE reports auxiliary information during the network registration process. The network configures a TA for the UE as TAC1 and indicates that the area in which the UE is located is the area of the boundary of TAs.

The UE receives the above information and keeps reading SIBI continuously. At Time T3, the TAC broadcast by the network changes from TAC1 to TAC2, and then the UE carries out the TAU.

Or, the area in which the UE is located is the area of the boundary of TAs, i.e., the area of the boundary of TAC1 and TAC2. At time T1, through the network registration process of the UE, the network configures the TA for the UE as TAC2.

At time T2, the UE performs cell re-selection and finds that the TAC1 broadcast by the current cell is no longer the TA configured by the network. Then, the UE reports auxiliary information during the network registration process. The network configures a TA for the UE as TAC1.

At Time T3, the TAC broadcast by the network changes from TAC1 to TAC2, but the UE does not perform the TAU because it does not read the system information. In response to determining that a descending text reaches the UE at this time and the network fails to page the UE through the cell corresponding to TAC1, the network then can determine according to the auxiliary information reported by the UE that the UE is currently located in a cell corresponding to TAC2, and the network pages the UE again through the cell corresponding to TAC2. TAC3 3 830, shown, is not used for these time periods.

In another example, for the UE located in the boundary of TAs, a TAI list configured by the network for the UE may include two TACs at the boundary.

For example, as shown in FIG. 8, the tracking area/registration area of the UE at the boundary of TAs includes TAC1 and TAC2, so the situation where the network fails to page the UE does not exist.

Figure 9:
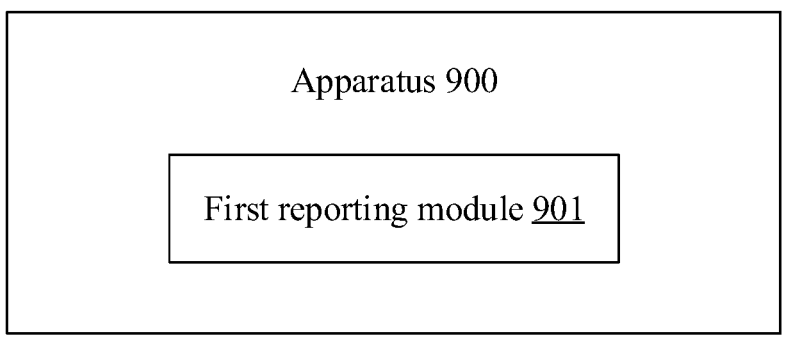
FIG. 9 is a first schematic structural diagram of a tracking area update apparatus, according to an example.

As shown in FIG. 9, an example of the present disclosure further provides a tracking area update apparatus 900, applied to the UE and includes a first reporting module 901 that is configured to report auxiliary information that includes location information and movement information of the UE. The auxiliary information is configured to determine whether the UE is located within a boundary of two Tracking Areas by a core network.

In some examples, the apparatus further includes a first receiving module that is configured to receive, from a base station, TA indication information determined by the core network according to the auxiliary information and a first updating module that is configured to perform TAU according to the TA indication information.

In some examples, the first updating module includes a first receiving submodule that is configured to receive an SIB from the base station according to the TA indication information and a first updating submodule that is configured to perform the TAU according to the SIB.

In some examples, the first updating submodule includes a first acquisition submodule that is configured to acquire changed information of TAC from the SIB and a second updating submodule that is configured to perform the TAU according to the changed information.

In some examples, the TA indication information includes boundary indication information for indicating the boundary of the two TAs.

In some examples, the first receiving submodule is specifically configured to receive the SIB broadcast by the base station in response to determining that the UE is located in the boundary according to the boundary indication information and the location information of the UE.

In some examples, the boundary indication information includes boundary area range information for indicating an area range that includes the boundary or boundary indication information for indicating that the UE is located in the boundary.

In some examples, the TA indication information includes TA information that includes a parameter for triggering the UE to perform TAU. The first receiving submodule is specifically configured to receive the SIB from the base station according to the TA information.

In some examples, the TA information includes a TAC and a TAC change waiting time. The TAC change waiting time is determined by the core network according to ephemeris information of a satellite corresponding to the base station and the auxiliary information. The first receiving submodule is specifically configured to receive, according to the TAC change waiting time, the SIB broadcast by the base station during a predetermined time period, including the waiting end time of the TAC change waiting time.

In some examples, the auxiliary information reported by the UE is further configured to determine a TA for broadcasting a paging message of the UE by the core network.

Figure 10:
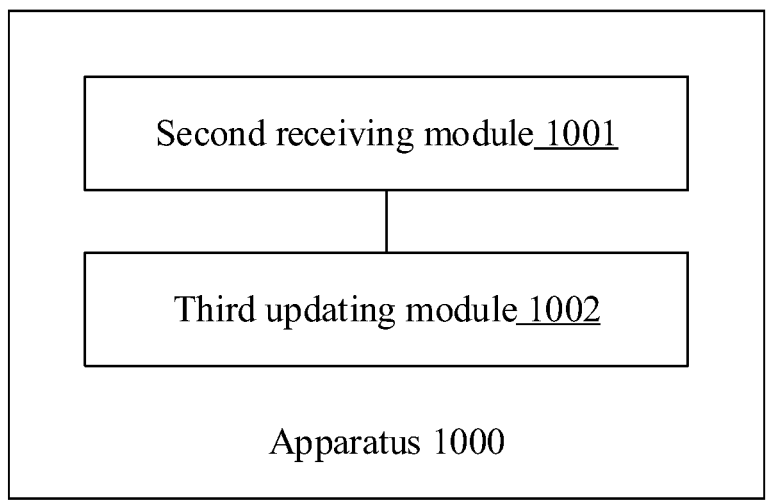
FIG. 10 is a second schematic structural diagram of a tracking area update apparatus, according to an example.

As shown in FIG. 10, an example of the present disclosure further provides a tracking area update apparatus 1000, applied to the UE, and includes a second receiving module 1001 that is configured to receive TA indication information sent by a core network and a third updating module 1002 that is configured to perform TAU according to the TA indication information.

In some examples, the third updating module includes a second receiving submodule that is configured to receive an SIB from a base station according to the TA indication information and a third updating submodule that is configured to perform the TAU according to the SIB.

In some examples, the third updating submodule includes a second acquisition submodule that is configured to acquire changed information of TAC from the SIB and a fourth updating submodule that is configured to perform the TAU according to the changed information.

In some examples, the TA indication information includes boundary indication information for indicating a boundary of at least two TAs.

In some examples, the second receiving submodule is specifically configured to receive the SIB broadcast by the base station in response to determining that the UE is located in the boundary according to the boundary indication information and the location information of the UE.

In some examples, the boundary indication information includes boundary area range information for indicating an area range that includes the boundary.

Figure 11:
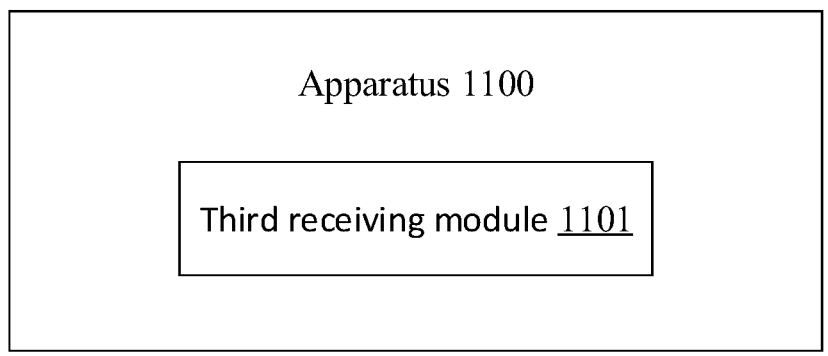
FIG. 11 is a third schematic structural diagram of a tracking area update apparatus, according to an example.

As shown in FIG. 11, an example of the present disclosure further provides a tracking area update apparatus 1100, applied to a core network, and includes a third receiving module 1101 that is configured to receive auxiliary information that includes location information and movement information of UE. The auxiliary information is configured to determine whether the UE is located within a boundary of two Tracking Areas by a core network.

In some examples, the apparatus further includes a first determining module that is configured to determine a TA in which the UE is located, according to the auxiliary information in response to determining that failure to page the UE, and a first sending module that is configured to broadcast a paging message for the UE in the TA in which the UE is currently located.

In some examples, the apparatus further includes a second sending module that is configured to send TA indication information in response to receiving the auxiliary information.

In some examples, the TA indication information includes boundary indication information for indicating a boundary of the two TAs.

In some examples, the boundary indication information includes boundary area range information for indicating an area range that includes the boundary, or boundary indication information for indicating that the UE is located in the boundary.

In some examples, the TA indication information includes TA information that includes a parameter for triggering the UE to perform TAU.

In some examples, the TA information includes a TAC and a TAC change waiting time. The TA information is configured to indicate to the UE to perform the TAU according to the TAC within the TAC change waiting time. The apparatus further includes a second determining module that is configured to determine the TAC change waiting time, according to ephemeris information of a satellite corresponding to a base station and the auxiliary information.

Figure 12:
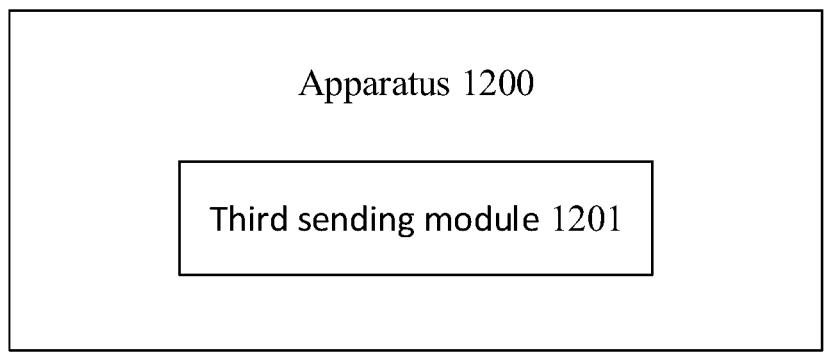
FIG. 12 is a fourth schematic structural diagram of a tracking area update apparatus, according to an example.

As shown in FIG. 12, an example of the present disclosure further provides a tracking area update apparatus 1200, applied to a core network, and includes a third sending module 1201 that is configured to send TA indication information that is at least configured to indicate to the UE to perform TAU.

In some examples, the TA indication information includes boundary indication information for indicating a boundary of two TAs.

In some examples, the apparatus further includes a fourth sending module that is configured to send an SIB by the base station through broadcasting, the SIB being configured to indicate to the UE to perform the TAU in response to determining that the UE is located in the boundary of the two Tas, according to the boundary indication information.

In some examples, the boundary indication information includes boundary area range information for indicating an area range that includes the boundary.

With regard to the apparatus in the above examples, the specific manners in which various modules perform operations have been described in detail in the examples relating to the methods, and, therefore, a detailed description is not further provided herein.

Figure 13:
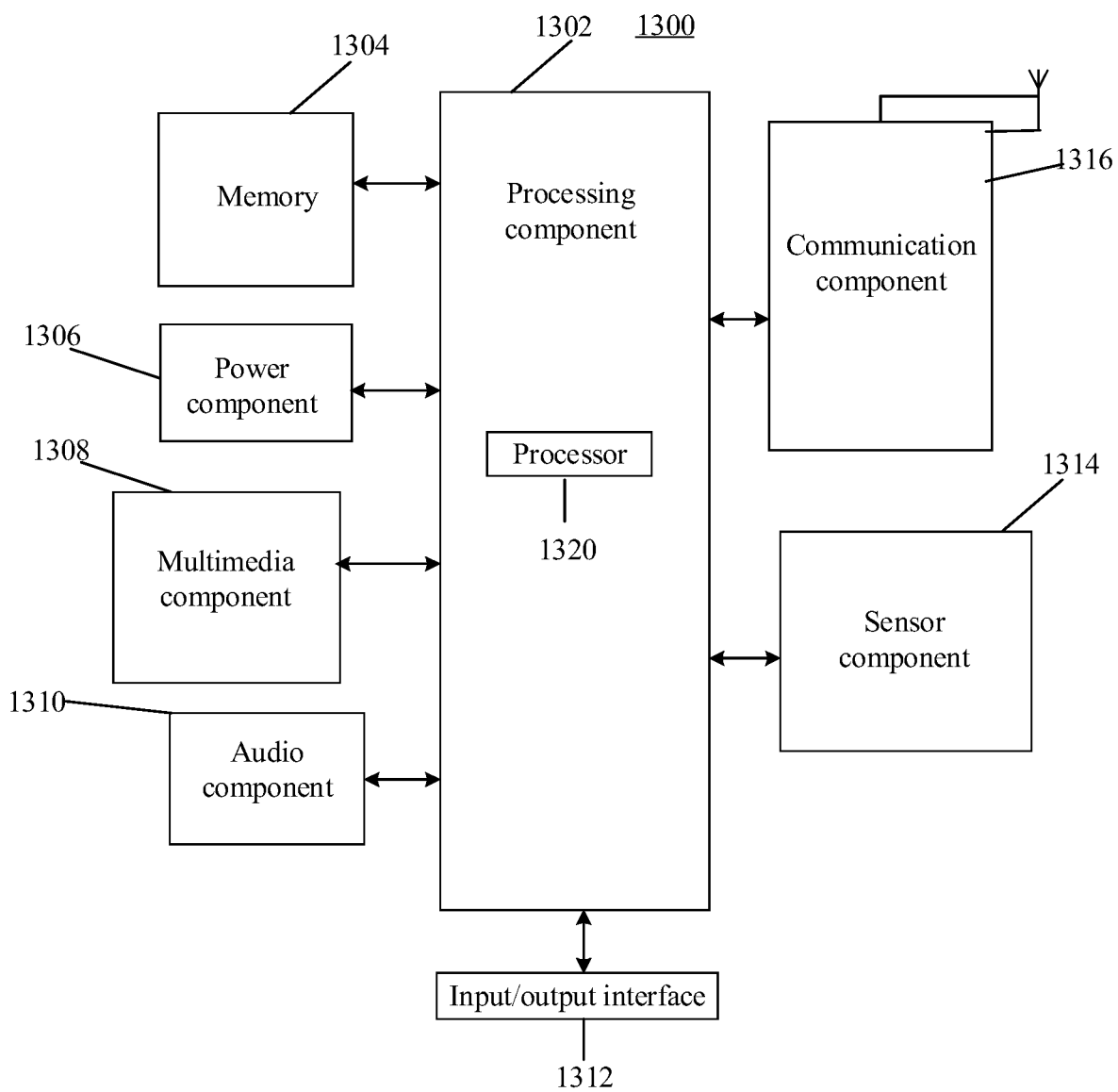
FIG. 13 is a first schematic structural diagram of a communication device, according to an example.

FIG. 13 is a structural block diagram of a communication device according to an example of the present disclosure. The communication device may be a terminal. For example, the communication device 1300 may be a mobile phone, a computer, a digital broadcasting user device, a messaging device, a game console, a tablet device, a medical device, a fitness device, a personal digital assistant, etc.

Referring to FIG. 10, the communication device 1300 may include at least one of the following components: a processing component 1302, a memory 1304, a power component 1306, a multimedia component 1308, an audio component 1310, an input/output (I/O) interface 1012, a sensor component 1014, and a communication component 1016.

The processing component 1302 generally controls the overall operations of the communication device 1300, such as operations associated with display, telephone calls, data communications, camera operations, and recording operations. The processing component 1302 may include at least one processor 1320 to execute instructions to complete all of or part of the steps of the above method. In addition, the processing component 1302 may include at least one module to facilitate the interaction between the processing component 1302 and other components. For example, the processing component 1302 may include a multimedia module to facilitate interaction between the multimedia component 1308 and the processing component 1302.

The memory 1304 is configured to store various types of data to support the operations at the communication device 1300. Examples of these data include instructions for any application or method operated on the communication device 1300, contact data, phone book data, messages, pictures, videos, etc. The memory 1304 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1306 provides power to various components of the communication device 1300. The power component 1306 may include a power management system, at least one power source, and other components associated with power generation, management, and distribution of the communication device 1300.

The multimedia component 1308 includes a screen for providing an output interface between the communication device 1300 and the user. In some examples, the screen may include a liquid crystal display (LCD) and a touch panel (TP). If the screen includes a touch panel, the screen may be implemented as a touch screen to receive input signals from the user. The touch panel includes at least one touch sensor to sense touches, slides, and gestures on the touch panel. The touch sensor may sense not only the boundary of the touch or slide, but also the wake-up time and pressure associated with the touch or slide. In some examples, the multimedia component 1308 includes a front camera and/or a rear camera. When the communication device 1300 is in an operation mode, such as a shooting mode or a video mode, the front camera and/or the rear camera may receive external multimedia data. Each front or rear camera may be a fixed optical lens system or have a focal length and optical zoom capability.

The audio component 1310 is configured to output and/or input an audio signal. For example, the audio component 1310 includes a microphone (MIC), which is configured to receive external audio signals when the communication device 1300 is in an operation mode, such as a call mode, a recording mode, and a voice recognition mode. The received audio signals may be further stored in the memory 1304 or sent by the communication component 1016. In some examples, the audio component 1310 further includes a speaker for outputting audio signals.

The I/O interface 1312 provides an interface between the processing component 1302 and a peripheral interface module. The peripheral interface module may be a keyboard, a click wheel, buttons, etc. These buttons may include, but are not limited to, a home button, a volume button, a start button, and a lock button.

The sensor component 1314 includes at least one sensor for providing various aspects of status assessment for the communication device 1300. For example, the sensor component 1014 may detect the on/off states of the communication device 1300, and a relative positioning of components, for example, the components are the display and keypad of the communication device 1300. The sensor component 1314 may further detect a change of position of the communication device 1300 or one component of the communication device 1300, whether or not the user touches the communication device 1300, a location or acceleration/deceleration of the communication device 1300, and a temperature variation of the communication device 1300. The sensor component 1314 may include a proximity sensor configured to detect the presence of nearby objects without any physical contact. The sensor component 1314 may further include an optical sensor, such as a CMOS or CCD image sensor, for use in imaging applications. In some examples, the sensor component 1314 may further include an acceleration sensor, a gyroscope sensor, a magnetic sensor, a pressure sensor, or a temperature sensor.

The communication component 1316 is configured to facilitate wired or wireless communication between the communication device 1300 and other devices. The communication device 1300 may access a wireless network based on communication standards, such as WiFi, 2G, or 3G, or a combination thereof. In an example, the communication component 1316 receives broadcast signals or broadcast-associated information from an external broadcast management system through a broadcast channel. In an example, the communication component 1316 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In an example, the communication device 1300 may be implemented by at least one application-specific integrated circuit (ASIC), digital signal processor (DSP), digital signal processing device (DSPD), programmable logic device (PLD), field programmable gate array (FPGA), controller, microcontroller, microprocessor, or other electronic components to execute the above method.

In an example, further provided is a non-temporary computer-readable storage medium including instructions, such as a memory 1304 including instructions executable by the processor 1320 of the communication device 1300 to complete the above method. For example, the non-temporary computer-readable storage medium may be an ROM, a random access memory (RAM), a CD-ROM, a magnetic tape, a floppy disk, an optical data storage device, etc.

Figure 14:
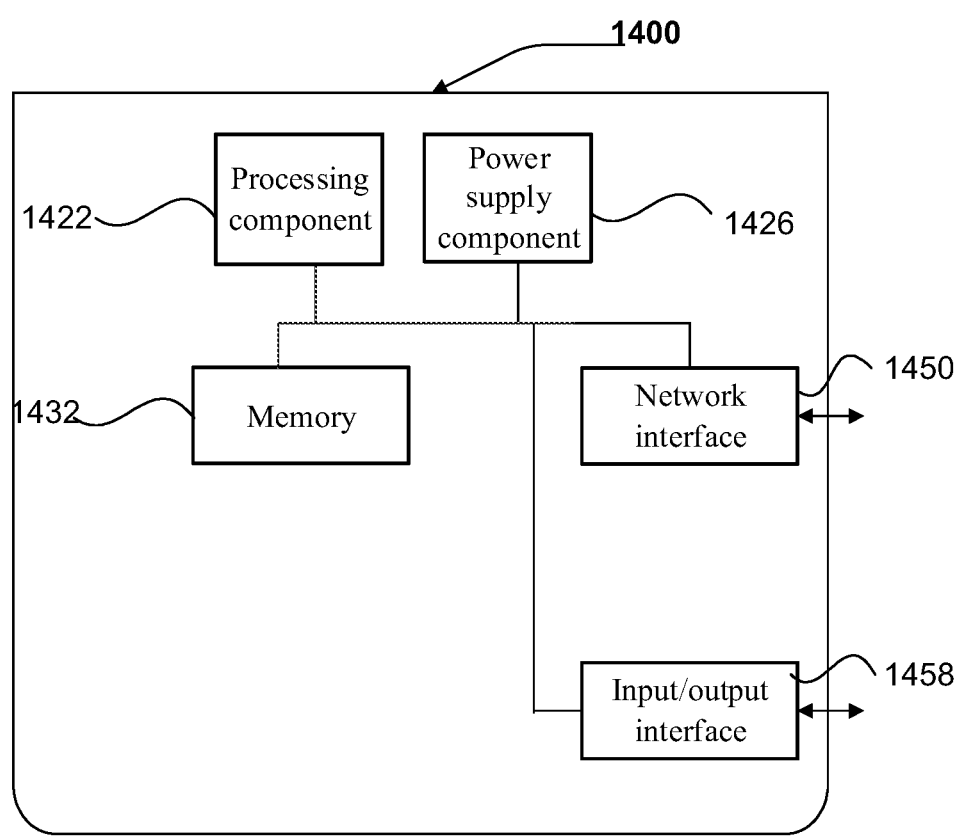
FIG. 14 is a second schematic structural diagram of a communication device, according to an example.

As shown in FIG. 14, an example of the present disclosure shows a structure of another communication device. The communication device may be the base station described in the examples of the present disclosure. For example, a communication device 1400 may be provided as a network device. Referring to FIG. 14, the communication device 1400 includes a processing component 1422, and further includes at least one processor, and a memory resource represented by the memory 1432, used to store instructions which may be executed by the processing component 1422, such as Apps. The applications stored in the memory 1432 may include one or more modules, each corresponding to a set of instructions. In addition, the processing component 1422 is configured to execute instructions, to perform any methods performed by the communication device of the above methods.

The communication device 1400 may further include a power component 1426 configured to execute power management on the communication device 1400, a wired or wireless network interface 1450 configured to connect the communication device 1400 to a network, and an input/output (I/O) interface 1458. The communication device 1400 may operate an operating system stored in the memory 1432, such as Windows Server™, Mac OS X™, Unix™, Linux™, FreeBSD™, or the like.

Additional non-limiting embodiments of the disclosure include the following 50 numbered embodiments provided below.

1. A tracking area update method, performed by UE (User Equipment) and including: reporting auxiliary information, the auxiliary information includes location information and movement information of the UE; the auxiliary information is configured to determine whether the UE is located within a boundary of two Tracking Areas by a core network.

2. The method according to embodiment 1, further including: receiving, from a base station, TA (Tracking Area) indication information determined by the core network according to the auxiliary information; and performing TAU (Tracking Area Update) according to the TA indication information.

3. The method according to embodiment 2, performing TAU (Tracking Area Update) according to the TA indication information includes: receiving a SIB (System Information Block) from the base station according to the TA indication information; and performing the TAU according to the SIB.

4. The method according to embodiment 3, performing the TAU according to the SIB includes: acquiring changed information of TAC (Tracking Area Code) from the SIB; and performing the TAU according to the changed information.

5. The method according to embodiment 3, the TA indication information includes: boundary indication information for indicating a boundary of the two TAs; receiving the SIB from the base station according to the TA indication information includes: receiving the SIB broadcast by the base station in response to determining that the UE is located in the boundary according to the boundary indication information and the location information of the UE.

6. The method according to embodiment 5, the boundary indication information includes at least one of: boundary area range information for indicating an area range that includes the boundary; or boundary indication information for indicating that the UE is located in the boundary.

7. The method according to embodiment 3, the TA indication information includes TA information, the TA information includes a parameter for triggering the UE to perform the TAU; receiving the SIB from the base station according to the TA indication information includes: receiving the SIB from the base station according to the TA information.

8. The method according to embodiment 7, the TA information includes a TAC and TAC change waiting time, and the TAC change waiting time is determined by the core network according to ephemeris information of a satellite corresponding to the base station and the auxiliary information; receiving the SIB from the base station according to the TA information includes: receiving, according to the TAC change waiting time, the SIB broadcasted by the base station during a predetermined time period including waiting end time of the TAC change waiting time.

9. The method according to any of embodiments 1-8, the auxiliary information reported by the UE is further configured to determine a TA for broadcasting a paging message of the UE by the core network.

10. A tracking area update method, performed by UE and including: receiving TA indication information sent by a core network; and performing TAU according to the TA indication information.

11. The method according to embodiment 10, performing TAU according to the TA indication information includes: receiving a SIB from a base station according to the TA indication information; and performing the TAU according to the SIB.

12. The method according to embodiment 11, performing the TAU according to the SIB includes: acquiring changed information of TAC from the SIB; and performing the TAU according to the changed information.

13. The method according to embodiment 10, the TA indication information includes: boundary indication information for indicating a boundary of at least two TAs; receiving the SIB from the base station according to the TA indication information includes: receiving the SIB broadcasted by the base station in response to determining that the UE is located in the boundary according to the boundary indication information and the location information of the UE.

14. The method according to embodiment 13, the boundary indication information includes: boundary area range information for indicating an area range that includes the boundary.

15. A tracking area update method, performed by a core network and including: receiving auxiliary information, the auxiliary information includes location information and movement information of the UE; the auxiliary information is configured to determine whether the UE is located within a boundary of two Tracking Areas by a core network.

16. The method according to embodiment 15, the method further includes: determining a TA in which the UE is located according to the auxiliary information in response to determining that failure to page the UE; and broadcasting a paging message for the UE in the TA in which the UE is currently located.

17. The method according to embodiment 15, the method further includes: sending TA indication information in response to determining that receiving the auxiliary information.

18. The method according to embodiment 17, the TA indication information includes: boundary indication information for indicating a boundary of the two TAs.

19. The method according to embodiment 18, the boundary indication information includes at least one of: boundary area range information for indicating an area range that includes the boundary; or boundary indication information for indicating that the UE is located in the boundary.

20. The method according to embodiment 18, the TA indication information includes TA information that includes a parameter for triggering the UE to perform the TAU.

21. The method according to embodiment 20, the TA information includes a TAC and TAC change waiting time, and the TA information is configured to indicate the UE to perform the TAU according to the TAC within the TAC change waiting time; the method further includes: determining the TAC change waiting time according to ephemeris information of a satellite corresponding to a base station and the auxiliary information.

22. A tracking area update method, performed by a core network and including: sending TA indication information, the TA indication information is at least configured to indicate UE to perform TAU.

23. The method according to embodiment 22, the TA indication information includes: boundary indication information for indicating a boundary of two TAs; the method further includes: sending a SIB by the base station through broadcasting, the SIB is configured to indicate UE to perform the TAU in response to determining that the UE is located in the boundary of the two TAs according to the boundary indication information.

24. The method according to embodiment 23, the boundary indication information includes: boundary area range information for indicating an area range that includes the boundary.

25. A tracking area update apparatus, applied to UE and including: a first reporting module, configured to report auxiliary information, the auxiliary information includes location information and movement information of the UE; the auxiliary information being configured to determine whether the UE is located within a boundary of two Tracking Areas by a core network.

26. The apparatus according to embodiment 25, the apparatus further includes: a first receiving module, configured to receive, from a base station, TA indication information determined by the core network according to the auxiliary information; and a first updating module, configured to perform TAU according to the TA indication information.

27. The apparatus according to embodiment 26, the first updating module includes: a first receiving submodule, configured to receive a SIB from the base station according to the TA indication information; and a first updating submodule, configured to perform the TAU according to the SIB.

28. The apparatus according to embodiment 27, the first updating submodule includes: a first acquisition submodule, configured to acquire changed information of TAC from the SIB; and a second updating submodule, configured to perform the TAU according to the changed information.

29. The apparatus according to embodiment 27, the TA indication information includes: boundary indication information for indicating a boundary of the two TAs; the first receiving submodule is specifically configured to receive the SIB broadcasted by the base station in response to determining that the UE is located in the boundary according to the boundary indication information and the location information of the UE.

30. The apparatus according to embodiment 29, the boundary indication information includes at least one of: boundary area range information for indicating an area range that includes the boundary; or boundary indication information for indicating that the UE is located in the boundary.

31. The apparatus according to embodiment 27, the TA indication information includes TA information, the TA information includes a parameter for triggering the UE to perform the TAU; the first receiving submodule is specifically configured to receive the SIB from the base station according to the TA information.

32. The apparatus according to embodiment 31, the TA information includes a TAC and TAC change waiting time, and the TAC change waiting time is determined by the core network according to ephemeris information of a satellite corresponding to the base station and the auxiliary information; the first receiving submodule is specifically configured to receive, according to the TAC change waiting time, the SIB broadcasted by the base station during a predetermined time period including waiting end time of the TAC change waiting time.

33. The apparatus according to any of embodiments 25-31, the auxiliary information reported by the UE is further configured to determine a TA for broadcasting a paging message of the UE by the core network.

34. A tracking area update apparatus, applied to UE and including: a second receiving module, configured to receive TA indication information sent by a core network; and a third updating module, configured to perform TAU according to the TA indication information.

35. The apparatus according to embodiment 34, the third updating module includes: a second receiving submodule, configured to receive a SIB from a base station according to the TA indication information; and a third updating submodule, configured to perform the TAU according to the SIB.

36. The apparatus according to embodiment 35, the third updating submodule includes: a second acquisition submodule, configured to acquire changed information of TAC from the SIB; and a fourth updating submodule, configured to perform the TAU according to the changed information.

37. The apparatus according to embodiment 34, the TA indication information includes: boundary indication information for indicating a boundary of at least two TAs; the second receiving submodule is specifically configured to receive the SIB broadcasted by the base station in response to determining that the UE is located in the boundary according to the boundary indication information and the location information of the UE.

38. The apparatus according to embodiment 37, the boundary indication information includes: boundary area range information for indicating an area range that includes the boundary.

39. A tracking area update apparatus, applied to a core network and including: a third receiving module, configured to receive auxiliary information, the auxiliary information includes location information and movement information of UE; the auxiliary information being configured to determine whether the UE is located within a boundary of two Tracking Areas by a core network.

40. The apparatus according to embodiment 39, the apparatus further includes: a first determining module, configured to, in response to failure to page the UE, determine a TA in which the UE is located according to the auxiliary information; and a first sending module, configured to broadcast a paging message for the UE in the TA in which the UE is currently located.

41. The apparatus according to embodiment 39, the apparatus further includes: a second sending module, configured to send TA indication information in response to receiving the auxiliary information.

42. The apparatus according to embodiment 41, the TA indication information includes: boundary indication information for indicating a boundary of the two TAs.

43. The apparatus according to embodiment 42, the boundary indication information includes at least one of: boundary area range information for indicating an area range that includes the boundary; or boundary indication information for indicating that the UE is located in the boundary.

44. The apparatus according to embodiment 42, the TA indication information includes TA information, the TA information includes a parameter for triggering the UE to perform the TAU.

45. The apparatus according to embodiment 44, the TA information includes a TAC and TAC change waiting time, and the TA information is configured to indicate the UE to perform the TAU according to the TAC within the TAC change waiting time; the apparatus further includes: a second determining module, configured to determine the TAC change waiting time according to ephemeris information of a satellite corresponding to a base station and the auxiliary information.

46. A tracking area update apparatus, applied to a core network and including: a third sending module, configured to send TA indication information, the TA indication information being at least configured to indicate UE to perform TAU.

47. The apparatus according to embodiment 46, the TA indication information includes: boundary indication information for indicating a boundary of two TAs; the apparatus further includes: a fourth sending module, configured to send a SIB by the base station through broadcasting, the SIB being configured to indicate UE to perform the TAU in response to determining that the UE is located in the boundary of the two TAs according to the boundary indication information.

48. The apparatus according to embodiment 47, the boundary indication information includes: boundary area range information for indicating an area range that includes the boundary.

49. A communication device, including: a processor and a memory for storing executable instructions capable of running on the processor, in response to determining that the processor is configured to run the executable instructions, the executable instructions execute the steps in the tracking area update method according to any of embodiments 1-14 or 15-24.

50. A non-temporary computer-readable storage medium storing computer-executable instructions, in response to determining that the computer-executable instructions are executed by a processor, the steps of the tracking area update method according to any of embodiments 1-14 or 15-24 are implemented.

Those skilled in the art would readily conceive of other implementations of the present disclosure after considering the specification and practicing the invention disclosed here. The present disclosure is intended to cover any variations, uses or adaptive changes of the present disclosure. These variations, uses or adaptive changes follow the general principle of the present disclosure and include common general knowledge or conventional technical means in the technical field that are not disclosed in the present disclosure. The description and the examples are merely regarded as exemplary, and the real scope and spirit of the disclosure are pointed out by the following claims.

It should be understood that the present disclosure is not limited to the precise structure described above and shown in the figures, and various modifications and changes can be made without departing from its scope. The scope of the present disclosure is only limited by the appended claims.

What is claimed is:

1. A tracking area update method, performed by User Equipment (UE), the method comprising:
reporting auxiliary information comprising location information and movement information of the UE, the auxiliary information being configured to determine whether the UE is located in a boundary of two Tracking Areas (TAs) by a core network;
receiving, from a base station, TA indication information determined by the core network according to the auxiliary information;
receiving a System Information Block (SIB) from the base station according to the TA indication information; and
performing Tracking Area Update (TAU) according to the SIB,
wherein the TA indication information comprises TA information;
wherein the TA information comprises a Tracking Area Code (TAC), a TAC change waiting time, and a parameter for triggering the UE to perform the TAU,
wherein the TAC change waiting time is determined by the core network according to ephemeris information of a satellite corresponding to the base station and the auxiliary information; and
wherein the step of receiving the SIB from the base station according to the TA indication information comprises receiving, according to the TAC change waiting time, the SIB broadcast by the base station during a predetermined time period comprising a waiting end time of the TAC change waiting time.

2. The method according to claim 1, wherein performing the TAU according to the SIB comprises:
acquiring changed information of the TAC from the SIB; and
performing the TAU according to the changed information.

3. The method according to claim 1,
wherein the TA indication information comprises:
boundary indication information for indicating a boundary of the two TAs; and
wherein the step of receiving the SIB from the base station according to the TA indication information comprises:
receiving the SIB broadcast by the base station in response to determining that the UE is located in the boundary according to the boundary indication information and the location information of the UE.

4. The method according to claim 3, wherein the boundary indication information comprises at least one of:
boundary area range information for indicating an area range comprising the boundary; or
boundary indication information for indicating that the UE is located in the boundary.

5. The method according to claim 1, wherein the auxiliary information reported by the UE is further configured to determine a TA for broadcasting a paging message of the UE by the core network.

6. The method according to claim 1, further comprising:
receiving the TA indication information sent by the core network; and
performing the TAU according to the TA indication information.

7. A tracking area update method, performed by a core network, the method comprising:
receiving auxiliary information comprising location information and movement information of User Equipment (UE), the auxiliary information being configured to determine whether the UE is located in a boundary of two Tracking Areas (TAs) by the core network; and
sending TA indication information in response to receiving the auxiliary information,
wherein the TA indication information comprises TA information and boundary indication information for indicating a boundary of the two TAs;
wherein the TA information comprises a parameter for triggering the UE to perform Tracking Area Update (TAU), a Tracking Area Code (TAC), and a TAC change waiting time;
wherein the TA information is configured to indicate to the UE to perform the TAU according to the TAC within the TAC change waiting time; and wherein the TAC change waiting time is determined according to ephemeris information of a satellite corresponding to a base station and the auxiliary information.

8. The method according to claim 7, wherein the method further comprises:
determining a TA in which the UE is located according to the auxiliary information in response to failing to page the UE; and
broadcasting a paging message for the UE in the TA in which the UE is currently located.

9. The method according to claim 7, wherein the boundary indication information comprises at least one of:
boundary area range information for indicating an area range comprising the boundary; or
boundary indication information for indicating that the UE is located in the boundary.

10. A communication device, comprising: a processor and a memory for storing executable instructions capable of running on the processor, wherein
the processor is configured to run the executable instructions, the executable instructions execute the steps in the tracking area update method according to claim 7.

11. The method according to claim 7, further comprising:
sending the TA indication information, wherein the TA indication information is at least configured to indicate to the UE to perform the TAU.

12. A communication device, comprising:
a processor; and
a memory for storing executable instructions capable of running on the processor,
wherein the processor is configured to:
report auxiliary information comprising location information and movement information of User Equipment, the auxiliary information being configured to determine whether the UE is located in a boundary of two Tracking Areas (TAs) by a core network,
receive, from a base station, TA indication information determined by the core network according to the auxiliary information,
receive a System Information Block (SIB) from the base station according to the TA indication information, and
perform Tracking Area Update (TAU) according to the SIB;
wherein the TA indication information comprises TA information;
wherein the TA information comprises a Tracking Area Code (TAC), a TAC change waiting time, and a parameter for triggering the UE to perform the TAU;
wherein the TAC change waiting time is determined by the core network according to ephemeris information of a satellite corresponding to the base station and the auxiliary information; and
wherein the processor is further configured, when receiving the SIB from the base station according to the TA indication information, to receive, according to the TAC change waiting time, the SIB broadcast by the base station during a predetermined time period comprising a waiting end time of the TAC change waiting time.

* * * * *